United States Patent
Kamada

(10) Patent No.: US 8,177,670 B2
(45) Date of Patent: May 15, 2012

(54) BICYCLE SPROCKET

(75) Inventor: Kenji Kamada, Osaka (JP)

(73) Assignee: Shimano Inc., Osaka (JP)

( * ) Notice: Subject to any disclaimer, the term of this patent is extended or adjusted under 35 U.S.C. 154(b) by 416 days.

(21) Appl. No.: 12/551,615

(22) Filed: Sep. 1, 2009

(65) Prior Publication Data

US 2011/0053721 A1    Mar. 3, 2011

(51) Int. Cl.
*F16H 55/12* (2006.01)
*F16H 7/06* (2006.01)

(52) U.S. Cl. ......... 474/160; 474/155; 474/156; 474/158

(58) Field of Classification Search ................ 474/160, 474/148, 156, 158, 152, 164, 78, 202
See application file for complete search history.

(56) References Cited

U.S. PATENT DOCUMENTS

| | | |
|---|---|---|
| 4,148,225 A | 4/1979 | Redmond, Jr. et al. |
| 4,889,521 A | 12/1989 | Nagano |
| 5,632,699 A | 5/1997 | Nakamura |
| 5,716,297 A | 2/1998 | Bodmer |
| 5,738,603 A | 4/1998 | Schmidt et al. |
| 5,830,096 A | 11/1998 | Schmidt et al. |
| 6,139,456 A | 10/2000 | Lii et al. |
| 6,805,645 B2 | 10/2004 | Mao et al. |
| 2008/0081719 A1 | 4/2008 | Young |

FOREIGN PATENT DOCUMENTS

| | | |
|---|---|---|
| DE | 10 2005 007 819 A1 | 8/2006 |
| EP | 0 522 984 A1 | 1/1993 |
| EP | 1 522 490 A2 | 4/2005 |
| FR | 861998 | 12/1939 |
| FR | 861998 | 2/1941 |
| FR | 2 774 061 A1 | 7/1999 |

OTHER PUBLICATIONS

European Search Report of corresponding EP Application No. 10 16 1986.4 dated Aug. 10, 2011.

*Primary Examiner* — Michael Mansen
*Assistant Examiner* — Henry Liu
(74) *Attorney, Agent, or Firm* — Global IP Counselors, LLP

(57) ABSTRACT

A bicycle sprocket is provided with a sprocket body and a chain engagement structure. The chain engagement structure includes sprocket teeth defining chain rollers receiving troughs. At least two consecutive ones of the troughs include a driven-side surface and a non-driven-side surface. The driven-side surfaces each have a first chain roller contact points corresponding to a first radius of a first minimum contact circle when one of the chain rollers is positioned to fittingly contact the driven-side surface. The non-driven-side surfaces each have a second chain roller contact points disposed at a second position corresponding to a second radius of a second minimum contact circle when one of the chain rollers is positioned to fittingly contact the non-driven-side surface. The first radius is larger than the second radius. The driven-side surfaces have effective concavities that are equal to or less than the curvatures of the chain rollers.

14 Claims, 10 Drawing Sheets

BICYCLE SPROCKET

BACKGROUND OF THE INVENTION

1. Field of the Invention

This invention generally relates to a sprocket for a bicycle. More specifically, the present invention relates a sprocket mounted to a wheel of a bicycle, in which the sprocket has a teeth arrangement that provides smooth reliable shifting.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned over the past years is the bicycle drive train. Specifically, manufacturers of bicycle components have been continually improving shifting performance of the various shifting components such as the shifter, the shift cable, the derailleur, the chain and the sprocket or sprockets.

One particular component of the drive train that has been extensively redesigned in the past years is the sprocket assembly for the bicycle. More specifically, the bicycle sprocket assembly has been designed with improved sprockets to provide smoother shifting. More specifically, the Hyper Glide sprocket assembly (HG rear sprocket assembly) described in U.S. Pat. No. 4,889,521 to Nagano has been developed and marketed worldwide. This sprocket assembly has been well accepted in the market and this engineering design for the sprocket assembly has become one of the industrial standards. Specifically, the HG rear sprocket assembly used with derailleurs in racing and mountain bicycles has become an industrial standard.

The HG sprockets typically have a chain guide surface on the smaller sprocket side of each sprocket, except for the smallest sprocket. The chain guide surface is positioned to receive a link plate and pin of the chain so as to move the chain much closer for smooth down shifting. Down shifting typically means shifting from a smaller rear sprocket to a larger rear sprocket so as to decrease gear ratio. Two adjacent sprockets are positioned relative to each other and relative to the chain guide surface with a particular phase relation. In order to maintain such phase relation, each sprocket has splines formed at its inner periphery. One of the splines is a different shape from the other splines to guide the sprockets on mating splines formed on the outer body of a multiple freewheel or free hub. The different shaped splines insure that adjacent sprockets are oriented in the proper phase relation.

SUMMARY OF THE INVENTION

One object of the present invention is to provide a sprocket for a sprocket assembly which provides smooth, reliable shifting performance.

The foregoing objects can basically be attained by providing a bicycle sprocket that mainly comprises a sprocket body and a chain engagement structure. The sprocket body has a center rotational axis of the bicycle sprocket. The chain engagement structure is disposed on an outer periphery of the sprocket body. The chain engagement structure includes a plurality of sprocket teeth extending radially outward from the outer periphery of the sprocket body. The sprocket teeth are circumferentially spaced around the outer periphery of the sprocket body such that the sprocket teeth define a plurality of troughs for receiving chain rollers of a bicycle chain. At least two consecutive ones of the troughs include a driven-side surface and a non-driven-side surface. The driven-side surfaces each have a first chain roller contact point disposed at a first position corresponding to a first radius of a first minimum contact circle with a center point on the center rotational axis of the bicycle sprocket when one of the chain rollers is positioned to fittingly contact the driven-side surface. The non-driven-side surfaces each have a second chain roller contact point disposed at a second position corresponding to a second radius of a second minimum contact circle with a center point on the center rotational axis of the bicycle sprocket when one of the chain rollers is positioned to fittingly contact the non-driven-side surface. The first radius is larger than the second radius. The driven-side surfaces have effective concavities that are equal to or less than the curvatures of the chain rollers.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
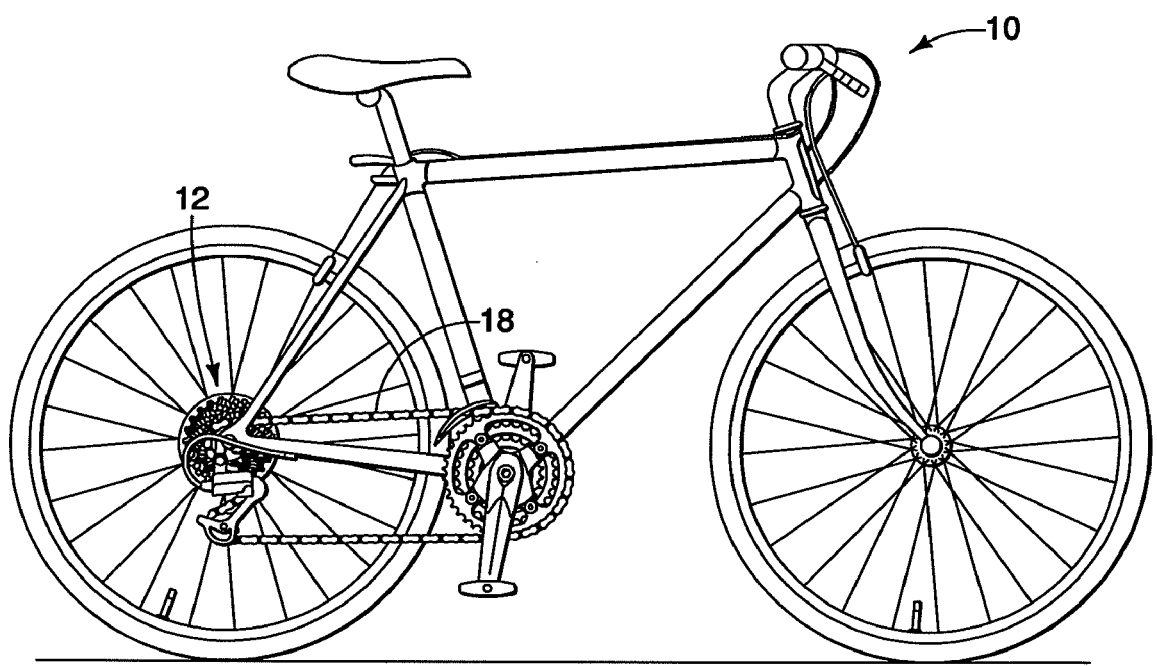
FIG. 1 is a side elevational view of a bicycle having a rear wheel with sprockets in accordance with a first illustrated embodiment.
Figure 2:
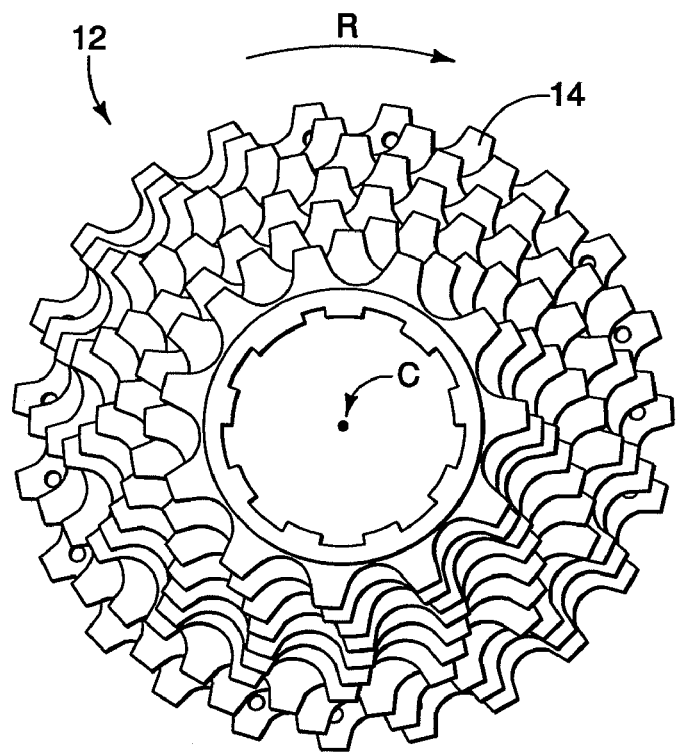
FIG. 2 is a side elevational view of a ten-stage sprocket assembly with in accordance with the first illustrated embodiment.
Figure 3:
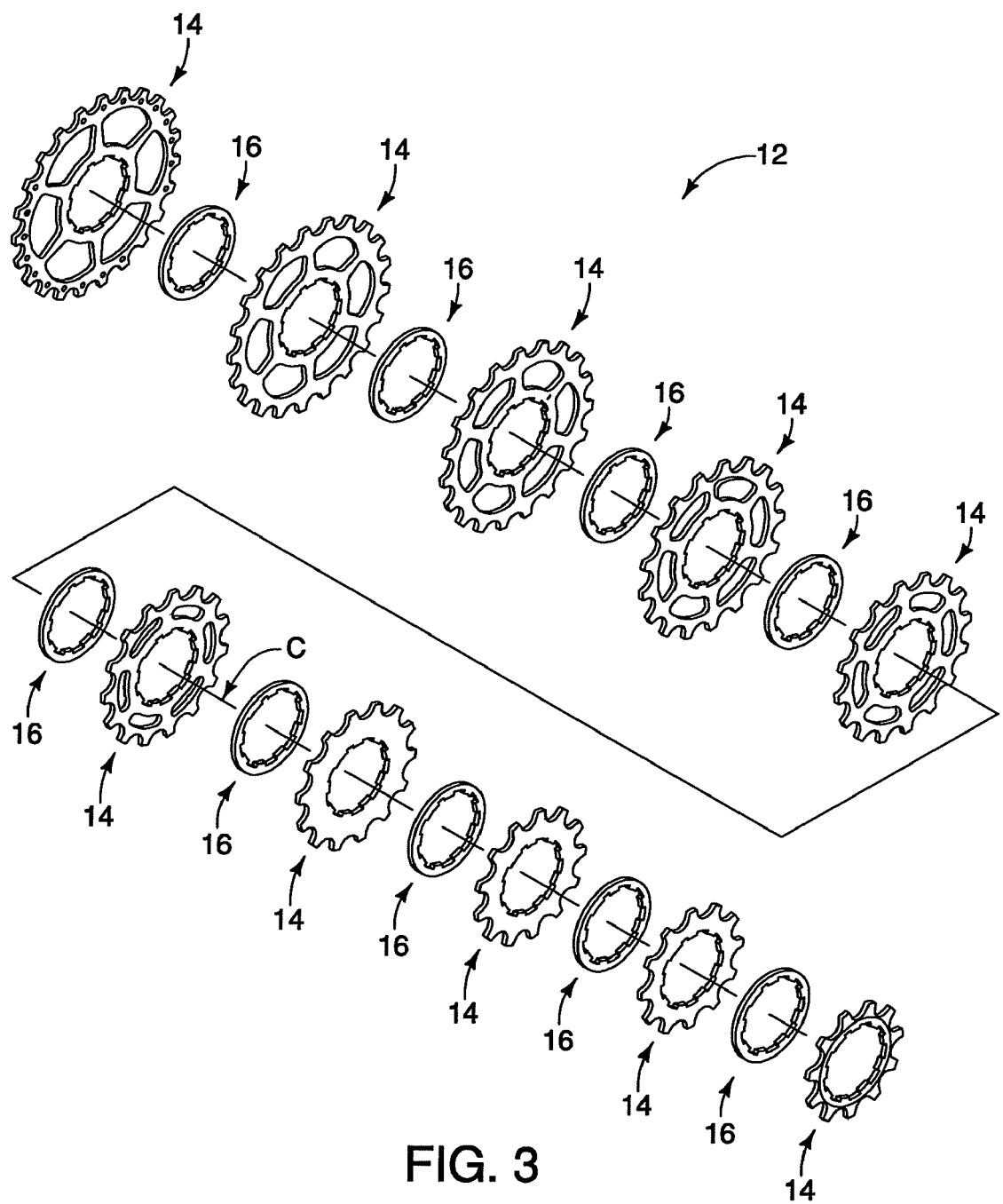
FIG. 3 is a perspective view of the sprocket assembly illustrated in FIG. 2.

Referring initially to FIGS. 1 to 3, a conventional bicycle 10 is illustrated with a rear multi-stage sprocket assembly 12 in accordance with a first embodiment. In the illustrated embodiment, the multi-stage sprocket assembly 12 includes a plurality of sprockets 14 and a plurality of spacers 16. Of course, it will be apparent to those skilled in the art from this disclosure that the sprockets 14, as described below, can be used with other types of multi-stage sprocket assemblies, which among other things can include fewer or more sprockets as well as spider types of freewheel mounting structures. The sprocket assembly 12 is one part of a conventional bicycle drivetrain that includes a bicycle chain 18.

As seen in FIGS. 2 and 3, the sprockets 14 are hard, rigid disc shaped members formed from a suitable material such as a metallic material. In the illustrated embodiment, the sprockets 14 are ach one-piece, unitary members formed of a metallic material that is suitable for a bicycle sprocket. In the illustrated embodiment, the sprockets 14, as seen in FIGS. 2 and 3, basically only differ in their overall diameter, number of teeth 30 and the size of weight reducing openings (if any) in the sprocket body 20.

Figure 4:
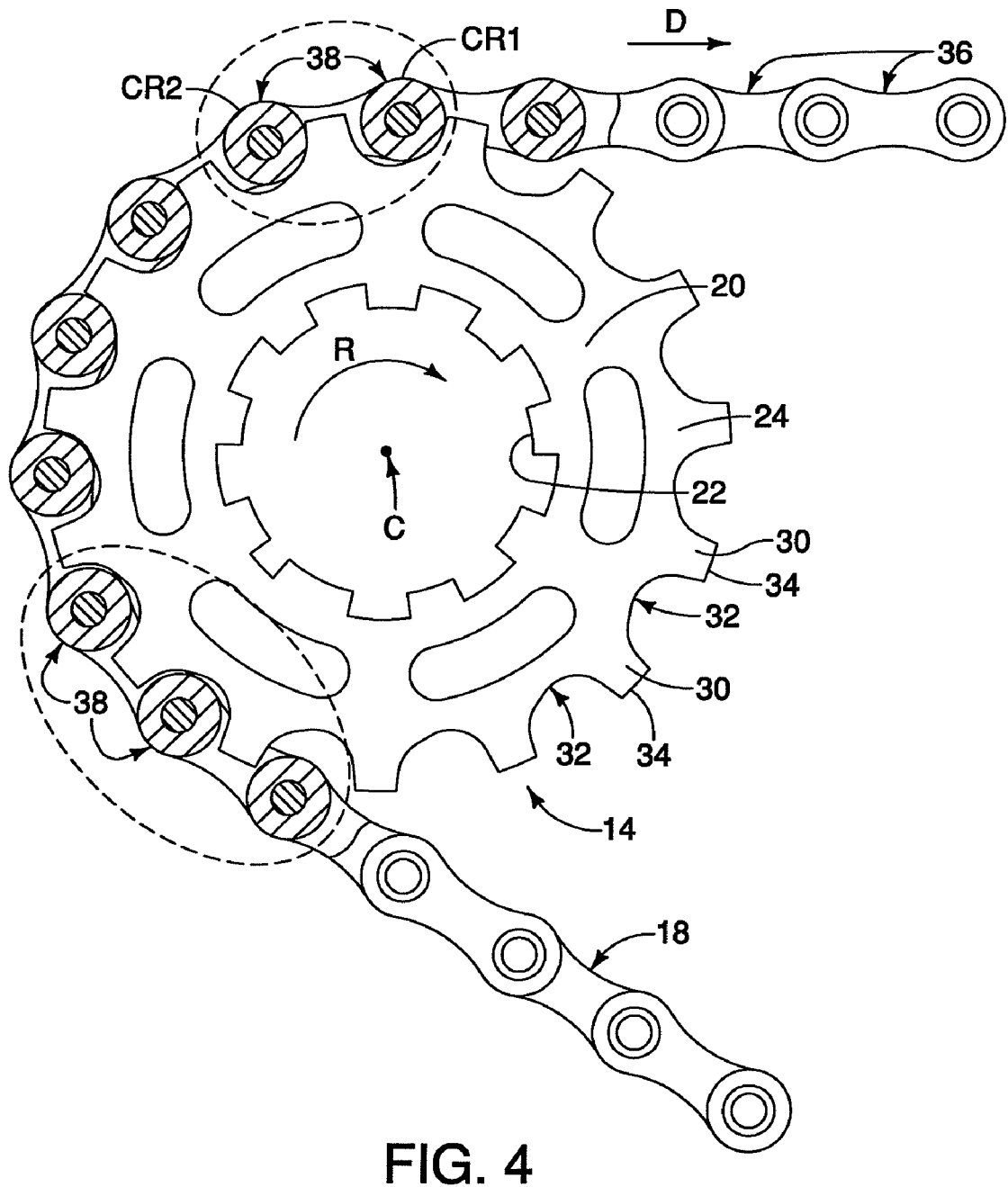
FIG. 4 is an enlarged side elevational view of one of the sprockets with a chain engaged therewith.

Referring now to FIG. 4, since the parts of the sprockets 14 are essentially the same for each of the sprockets 14, with respect to the present invention, only one of the sprockets 14 will be illustrated in detail herein. As seen in FIG. 4, each of the sprockets 14 (only one shown) basically includes a sprocket body 20, a freewheel or hub mounting structure 22 and a chain engagement structure 24. The chain engagement structure 24 includes a plurality of sprocket teeth 30 (only two labeled in FIG. 4) with a plurality of troughs or roots 32 (only two labeled in FIG. 4) interposed between tip ends 34 (only two labeled in FIG. 4) of the teeth 30.

The mounting structure 22 is a splined bore that defines the inner periphery of the sprocket body 20. Of course, it will be apparent to those skilled in the art from this disclosure that each of the sprockets 14 can have other types of mounting structures that are suitable for securing the sprockets 14 to a bicycle hub. Moreover, while the mounting structures 22 of the sprockets 14 are identical as illustrated in FIGS. 2 and 3, it will be apparent to those skilled in the art from this disclosure that the mounting structures 22 of the sprockets 14 can vary between each of the mounting structures 22 of the sprockets 14 as needed and/or desired.

The chain engagement structure 24 is formed on the outer periphery of the sprocket body 20. In particular, the teeth 30 extend radially outwardly from an outer periphery of the sprocket body 20 with the troughs 32 interposed between the teeth 30. Preferably, the teeth 30 are equally spaced apart from each other. Thus, the troughs 32 are arranged in an alternating manner between the teeth 30 and equally spaced apart from each other. Optionally, the axial faces of the chain engagement structure 24 can include various shift aiding structures (not shown) such as the ones described in U.S. Pat. No. 4,889,521, as needed and/or desired. For the sake of simplicity, shift aiding structures are not illustrated on the axial faces of the chain engagement structure 24.

Referring again to FIG. 4, one of the sprockets 14 is illustrated with the chain 18 engaged in a driving condition. As mentioned above, since the main features of the sprockets 14 are the same, only one of the sprockets 14 will be described in detail herein. Of course, the sprockets 14 can be different from each other with respect to other features not related to the present invention. As seen in FIG. 4, the sprocket 14 rotates in a rotational direction R to drive the chain 18 in a drive direction D. The chain 18 has a plurality of chain links 36 (only two labeled in FIG. 4) with a plurality of chain rollers 38 (only four labeled in FIG. 4). From the center of each of the chain rollers 38 to the center of the next chain roller 38 is one-half inch (12.7 mm). This dimension is known as the "pitch" of the chain 18. The chain 18 can be any chain that is used with a bicycle sprocket. Thus, the chain 18 will not be described in further detail herein. The troughs 32 of the last two teeth 30 engaged with the chain rollers 38 (main drive rollers) in the rotational direction R define an area that is called a chain disengagement portion of the sprocket 14. The chain rollers 38 that constitute the main drive rollers are referred to as chain rollers CR1 and CR2. Of course, the chain rollers 38 that constitute the main drive rollers CR1 and CR2 are constantly change as the sprocket 14 rotates in the drive direction D.

Figure 5:
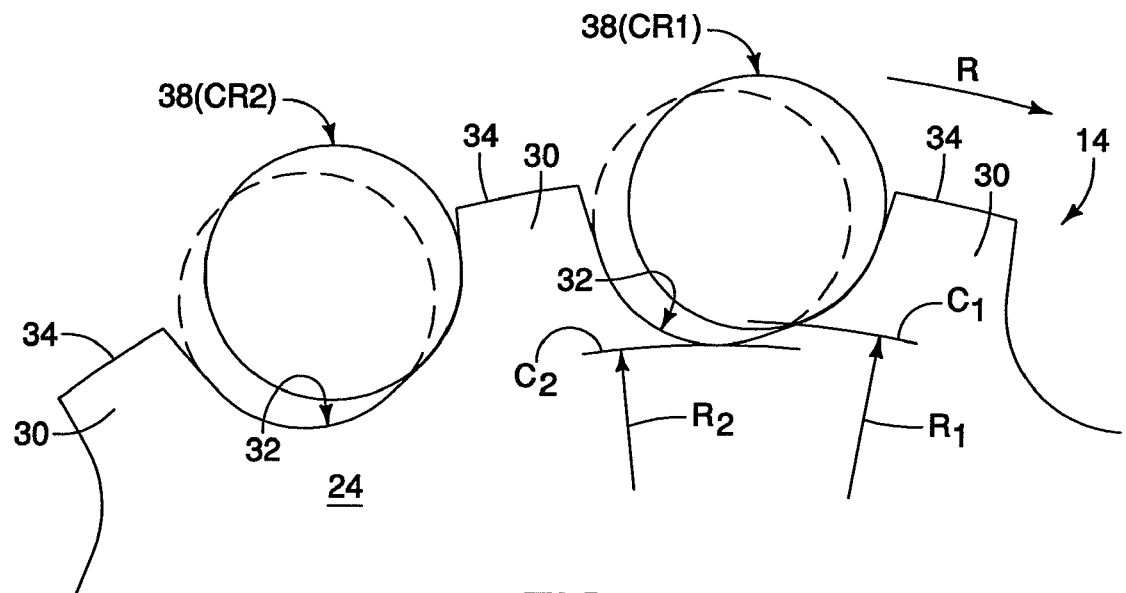
FIG. 5 is an enlarged, partial side elevational view of three teeth of the sprocket illustrated in FIG. 4 to illustrate the relationship between the chain rollers (main drive rollers) and the troughs of the last two teeth that are contacting before the chain disengages the sprocket during a normal driving operation of the chain in the drive direction.
Figure 6:
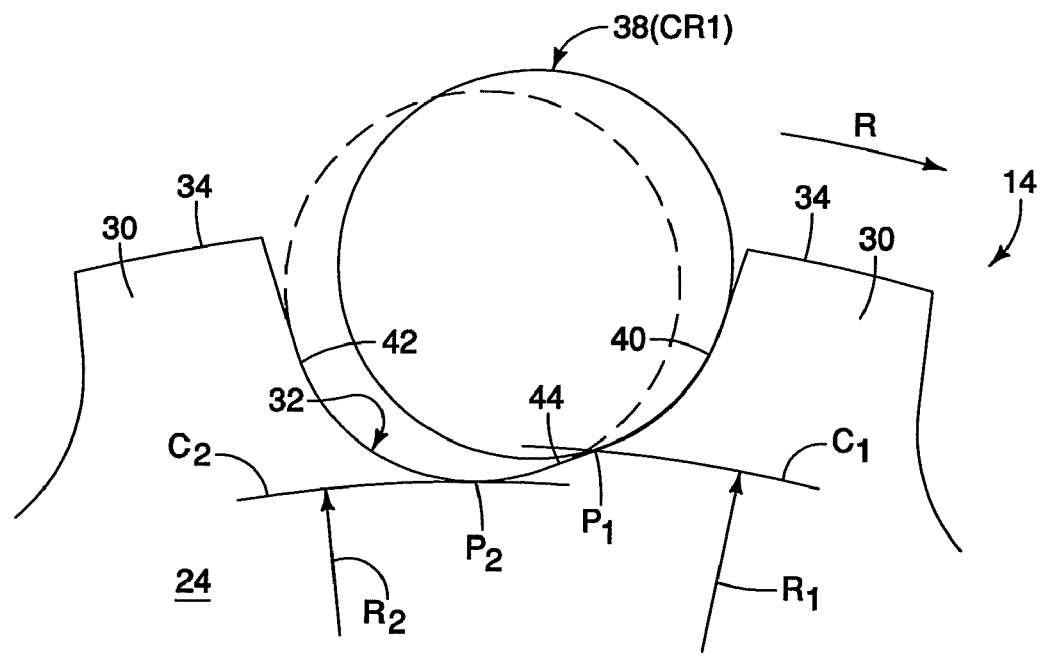
FIG. 6 is an enlarged, partial side elevational view of the area between two of the teeth of the sprocket illustrated in FIGS. 4 and 5.
Figure 7:
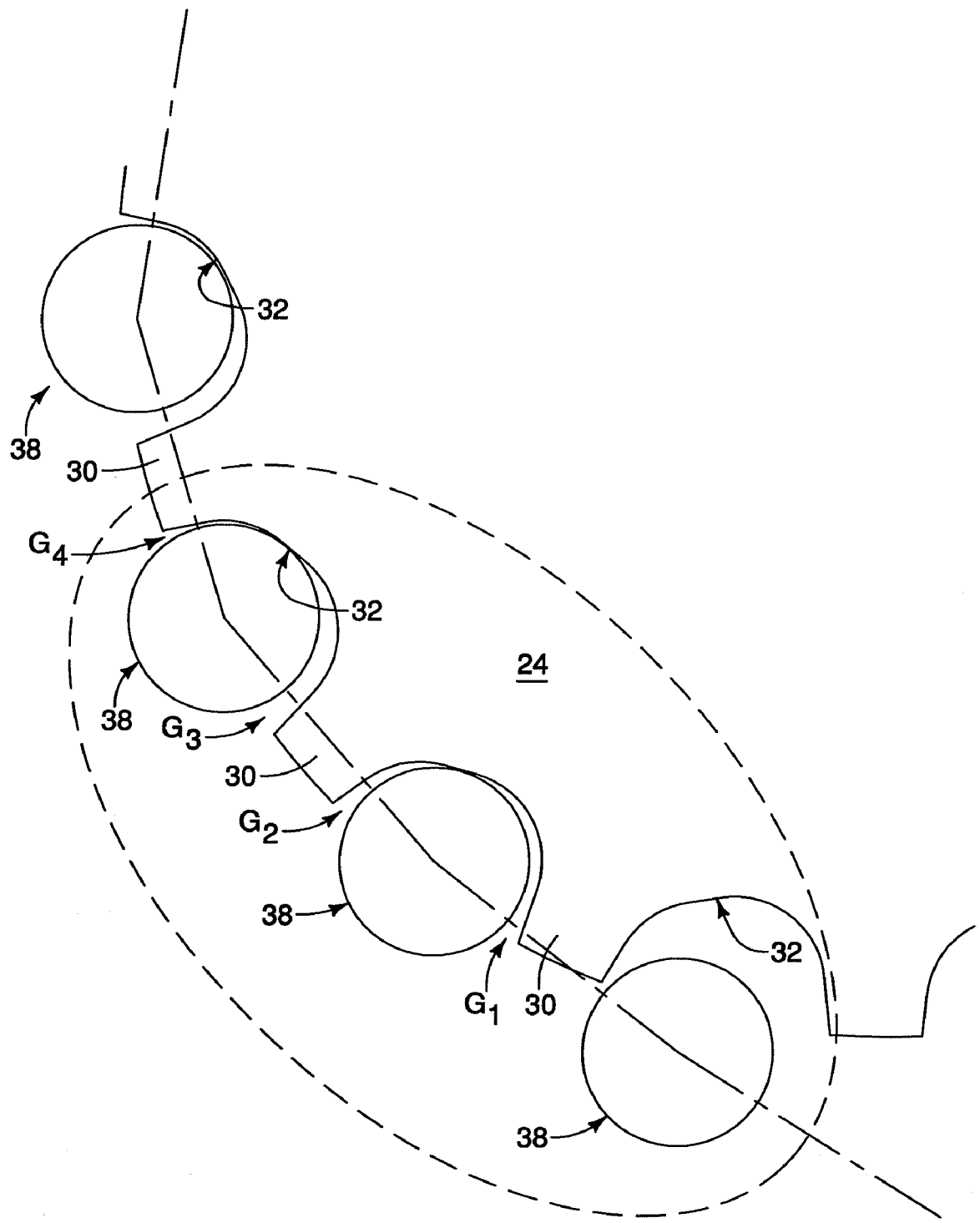
FIG. 7 is an enlarged, partial side elevational view of the sprocket illustrated in FIGS. 4 to 6 in the vicinity of the rear derailleur.

Referring now to FIGS. 5 to 7, the troughs 32 will now be discussed in more detail. Preferably, more than half of the troughs 32 have the configuration shown in FIGS. 5 and 6, with the troughs 32 of the present invention being arranged in consecutive pairs. More preferably, more than 80% of the troughs 32 have the configuration shown in FIGS. 5 and 6, with the troughs 32 of the present invention being arranged in consecutive pairs. Of course, as seen in FIG. 4, all of the troughs 32 of the sprocket 14 can have the configuration shown in FIGS. 5 and 6. FIG. 5 illustrates the relationship between the chain rollers 38 (main drive rollers) and the two teeth 30 of the sprocket 14 that are contacting before the chain 18 disengages the sprocket 14 during a normal driving operation of the chain 18 in the drive direction D. FIG. 6 is an enlarged, partial side elevational view of the area between two of the teeth 30 of the sprocket 14 illustrated in FIG. 5. FIG. 7 is an enlarged, partial side elevational view of the sprocket 14 illustrated in FIGS. 4 to 6 in the vicinity of the rear derailleur when the two teeth 30 of the sprocket 14 that are engaged with the main drive rollers CR1 and CR2 are configured as seen in FIGS. 5 and 6.

The troughs 32 are dimensioned to achieve smooth movement or displacement of the chain 18 from the sprocket 14 during shifting due to a sufficient gap being maintained at the vicinity of the rear derailleur while at the same time providing a greater engagement margin for preventing the chain 18 from running off the tip end 34 of the teeth 30 due to a situation in which the tooth pitch gets longer than the chain pitch. Each of the troughs 32 includes a driven-side surface 40 and a non-driven-side surface 42. The boundary between the driven-side surface 40 and the non-driven-side surface 42 for each of the troughs 32 is connected by a transition surface 44 that extends between the driven-side and non-driven-side surfaces 40 and 42, respectively. The driven-side surface 40 is located downstream of the non-driven-side surface 42 relative to the rotational direction R. The driven-side surfaces 40 of the troughs 32 contact the chain rollers 38 to drive the chain 18 in the drive direction D (FIG. 4).

As seen in FIG. 7, with this configuration of the troughs 32, the first two of the chain rollers 38 that contact the troughs 32 of the sprocket 14 in the area in the vicinity of the rear derailleur (not shown in FIG. 7) will contact the troughs 32 of the sprocket 14 such that gaps $G_1$ to $G_4$ are formed between the chain rollers 38 and both of the driven-side surfaces 40 and the non-driven-side surfaces 42, respectively. This configuration of the troughs 32 allows for the chain 18 to be moved laterally with respect to the center plane of the sprocket 14 by the derailleur.

Each of the driven-side surfaces 40 has a first chain roller contact point $P_1$ disposed at a first position corresponding to a first radius $R_1$ of a first minimum contact circle $C_1$ with a center point on the center rotational axis C (see FIG. 4) of the bicycle sprocket 14 when one of the chain rollers 38 is positioned to fittingly contact the driven-side surface 40. Each of the non-driven-side surfaces 42 has a second chain roller contact point $P_2$ disposed at a second position corresponding to a second radius $R_2$ of a second minimum contact circle $C_2$ with a center point on the center rotational axis C (see FIG. 4) of the bicycle sprocket 14 when one of the chain rollers 38 is positioned to fittingly contact the non-driven-side surface 42. The first radius $R_1$ is larger than the second radius $R_2$. The transition surface 44 is defined as the portion of the trough 32 that is between the first and second chain roller contact points $P_1$ and $P_2$. Thus, the driven-side surface 40 extends from the tip end 34 of the downstream tooth 30 to the first chain roller contact point $P_1$, while the non-driven-side surface 42 extends from the tip end 34 of the upstream tooth 30 to the second chain roller contact point $P_2$, for a given one of the troughs 32.

The first radius $R_1$ is measured from the center rotational axis C (see FIG. 4) of the bicycle sprocket 14 to the first minimum contact circle $C_1$. The first minimum contact circle $C_1$ has its center located on the center rotational axis C (see FIG. 4) of the bicycle sprocket 14. Also the first minimum contact circle $C_1$ intersects with the chain roller contact point (e.g., point $P_1$) of the chain roller 28 with the driven-side surface 40 that is closest to the center rotational axis C (see FIG. 4) of the bicycle sprocket 14 when the chain roller 28 is positioned to fittingly contact the driven-side surface 40. The term "fittingly contact" as used herein with respect to the driven-side surface of a tooth means when the chain roller of a new chain is properly seated in a contacting position with a driven-side surface of a tooth of a new sprocket in a forward drive condition.

The second radius $R_2$ is also measured from the center rotational axis C (see FIG. 4) of the bicycle sprocket 14 to the second minimum contact circle $C_2$. The second minimum contact circle $C_2$ has its center located on the center rotational axis C (see FIG. 4) of the bicycle sprocket 14. Also the second minimum contact circle $C_2$ intersects with the chain roller contact point (e.g., point $P_2$) of the chain roller 28 with the non-driven-side surface 42 that is closest to the center rotational axis C (see FIG. 4) of the bicycle sprocket 14 when the chain roller 28 is positioned to fittingly contact the non-driven-side surface 42. The term "fittingly contact" as used herein with respect to the non-driven-side surface of a tooth means when the chain roller of a new chain is properly seated in a contacting position with a non-driven-side surface of a tooth of a new sprocket in a rearward drive condition (i.e., opposite rotation from the rotational direction R in FIG. 4).

In this first embodiment, each of the driven-side surfaces 40 has an effective concavity that is equal to the curvatures of the chain rollers 38 as shown. In other words, the effective concavity of each of the driven-side surfaces 40 is formed by a curved surface with a single curvature, respectively. The non-driven-side surfaces 42 are also curved surfaces with effective concavities that are equal to the curvatures of the chain rollers 38. In other words, the effective concavity of each of the non-driven-side surfaces 42 is formed by a curved surface with a single curvature, respectively. The transition surfaces 44 are linear or flat surfaces that extend between the driven-side and non-driven-side surfaces 40 and 42, respectively. The terms "effective concavity" and "effective concavities" as used herein are not limited to concavities formed by a curved surface with a single curvature as seen in some the other illustrated embodiments. Rather, the terms "effective concavity" and "effective concavities" as used herein refers to one or more surfaces (curved and/or flat surfaces) that are arranged to define a generally overall concave profile.

Figure 8:
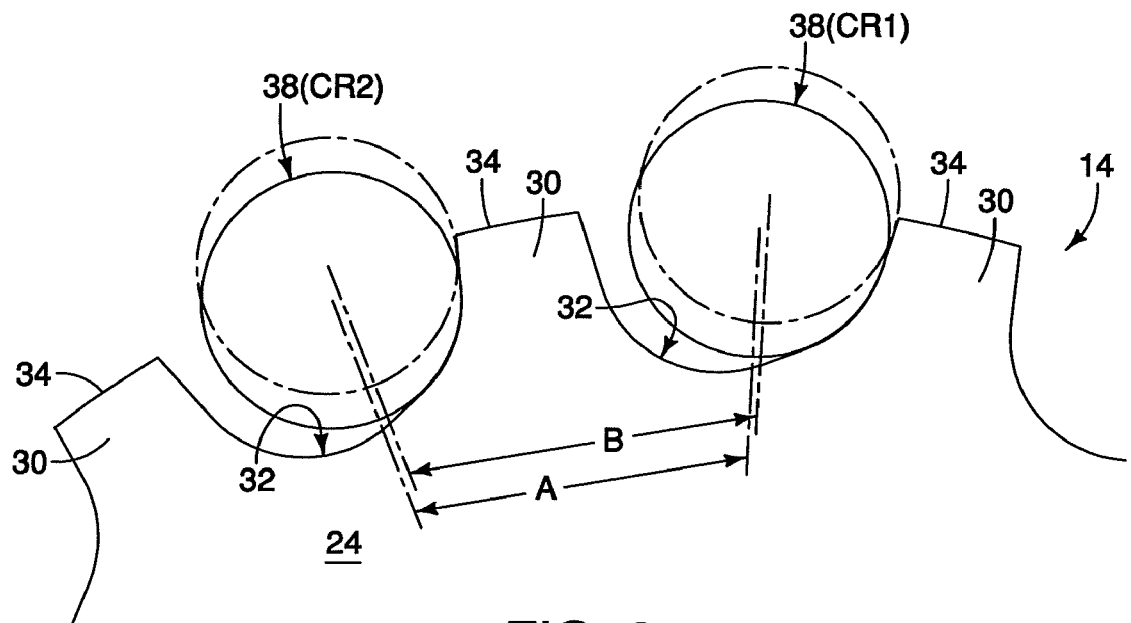
FIG. 8 is an enlarged, partial side elevational view of the sprocket illustrated in FIGS. 4 to 7 with one set of the chain rollers (solid line) in a normal driving condition and the other set of the chain rollers (dot-dash lines) in a driving condition in which a contaminate has adhered to the teeth of the sprocket so that the chain rollers are not fully seated on the teeth of the sprocket.

Referring now to FIG. 8, the sprocket 14 is illustrated with one set of the chain rollers 38 (solid line) in a normal driving condition, while the other set of the chain rollers 38 (dot-dash lines) in a non-normal driving condition in which a contaminate (e.g., mud, sand or the like) has adhered to the teeth 30 of the sprocket 14. When a contaminate has adhered to the teeth 30 of the sprocket 14, the chain rollers 38 are not fully seated in the troughs 32 of the teeth 30 of the sprocket 14 (i.e., the chain rollers 38 are not fittingly contacting the troughs 32 of the teeth 30 of the sprocket 14). In this case, the contaminate that has adhered to the teeth 30 of the sprocket 14 causes the chain rollers 38 to engage the teeth 30 at a higher (radially outward) position with respect to the normal engagement position shown in a solid line in FIG. 8. Thus, the original tooth pitch A becomes longer (e.g., tooth pitch B after contamination) as a result of the contaminate adhering to the teeth 30 of the sprocket 14.

Figure 9:
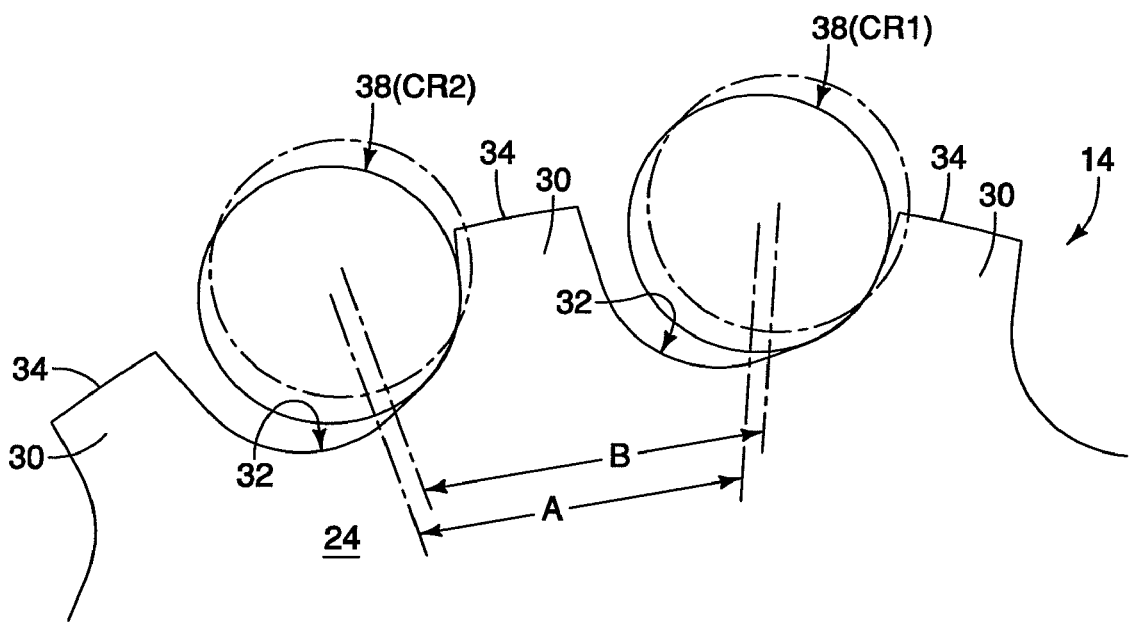
FIG. 9 is an enlarged, partial side elevational view of the sprocket illustrated in FIGS. 4 to 8 with one set of the chain rollers (solid line) in a normal driving condition and the other set of the chain rollers (dot-dash lines) in a driving condition in which the teeth of the sprocket are worn down so that the chain rollers are not fully seated on the teeth of the sprocket.

Referring now to FIG. 9, the sprocket 14 is illustrated with one set of the chain rollers 38 (solid line) in a normal driving condition, while the other set of the chain rollers 38 (dot-dash lines) in a non-normal driving condition in which the teeth 30 of the sprocket 14 are worn down. When the teeth 30 of the sprocket 14 are worn down, the chain rollers 38 are not fully seated on the teeth 30 of the sprocket 14 (i.e., the chain rollers 38 are not fittingly contacting the troughs 32 of the teeth 30 of the sprocket 14). In this case, the wear of the teeth 30 of the sprocket 14 causes the chain rollers 38 to engage the teeth 30 at a higher (radially outward) position with respect to the normal engagement position shown in a solid line in FIG. 9. Thus, the original tooth pitch A becomes longer (e.g., tooth pitch C after wear) as a result of the contaminate adhering to the teeth 30 of the sprocket 14.

However, with the configuration of the troughs 32, as discussed above, a greater engagement margin is provided over the conventional sprocket configuration for preventing the chain rollers 38 of the chain 18 from running off the tip of the tooth 30 due to the situation in which the tooth pitch gets longer than the chain pitch because of either the adherence of a contaminate or tooth wear.

Figure 10:
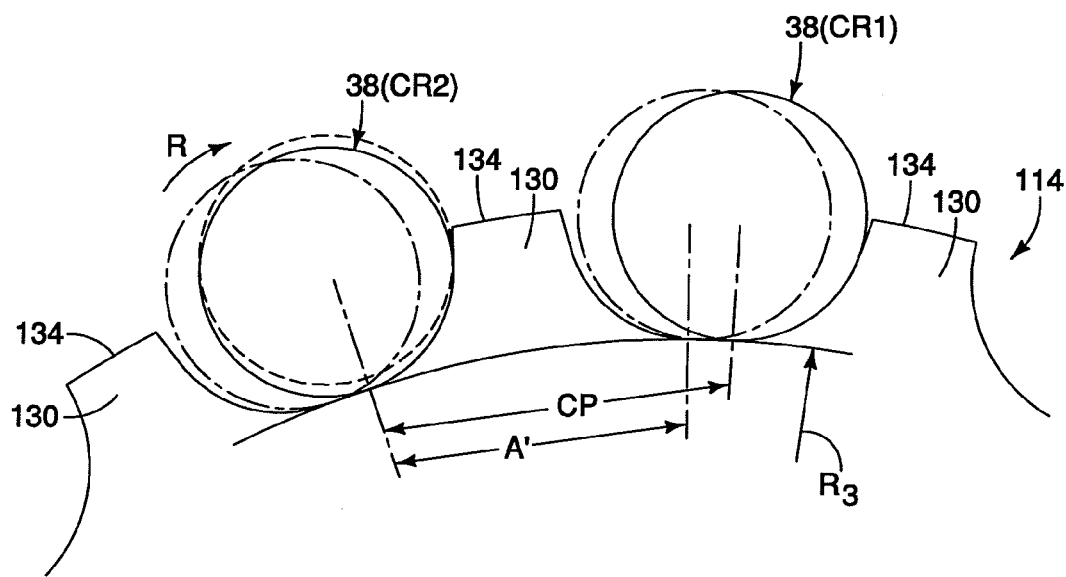
FIG. 10 is an enlarged, partial side elevational view of two teeth of a conventional sprocket with the chain rollers illustrated in solid lines to illustrate the chain rollers in a driving condition and illustrated dot-dash lines to illustrate the chain rollers in a non-driving condition.
Figure 11:
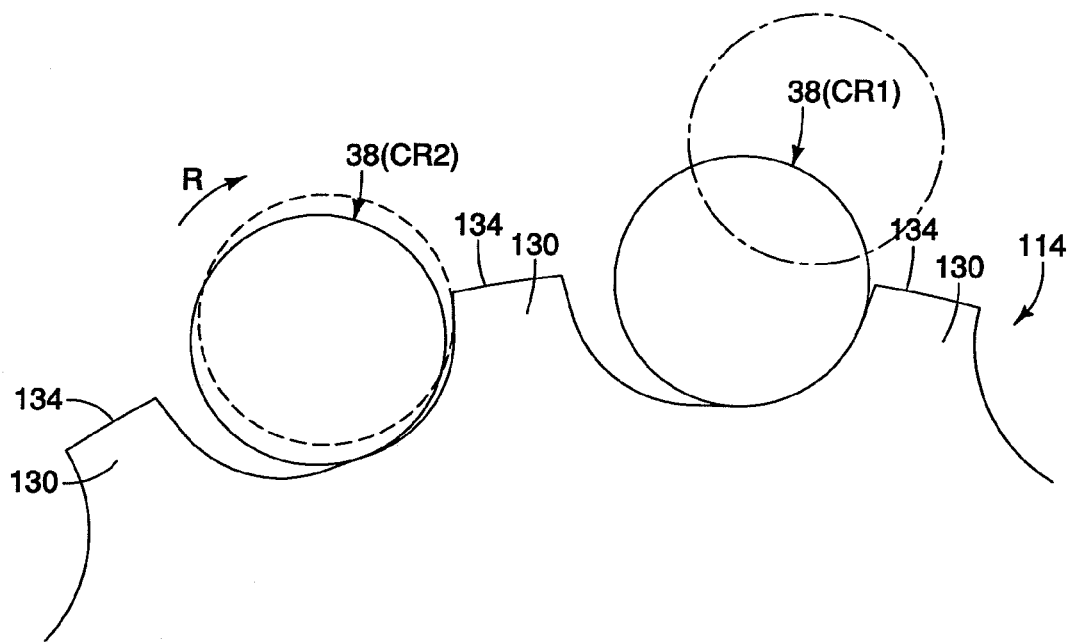
FIG. 11 is an enlarged, partial side elevational view of two teeth of the conventional sprocket illustrated in FIG. 10, but with the chain rollers illustrated in solid lines to illustrate the chain rollers in a driving condition and illustrated in dash lines to illustrate the chain rollers disengaging from the sprocket.

Referring now to FIGS. 10 and 11, a chain disengagement portion of a conventional sprocket 114 is illustrated in which radiuses $R_3$ of the minimum contact circles at the driven-side surfaces are equal to the radiuses of the minimum contact circles of the non-driven-side surfaces, and in which a tooth pitch A' is less than a chain pitch CP. In FIG. 10 and 11, a relationship is illustrated that occurs between the last two of the chain rollers 38 (main drive rollers) and the two teeth 130 of the conventional sprocket 114 just prior to the chain rollers CR1 and CR2 (main drive rollers) disengaging the chain 18.

In FIG. 10, the normal drive position of the chain rollers CR1 and CR2 (main drive rollers) are shown in solid lines. The circle shown in dashed lines in FIG. 10 illustrates a virtual circle for measuring tooth pitch A'. The two circles shown in dot dashed lines in FIG. 10 illustrate the positions of the chain rollers 38 in fittingly contact with the non-driven-side surfaces. In FIG. 11, the normal driving position of the chain rollers CR1 and CR2 (main drive rollers) are shown in solid lines, while the two circles shown in dashed lines illustrates the chain rollers (main drive rollers) disengaging the conventional sprocket 114 as the conventional sprocket 114 rotates in the rotational direction R.

As mentioned above, in the conventional sprocket 114, each tooth 130 has a shape in which the radius of the minimum contact circle at the driven-side surface is equal to that of the minimum contact circle at the non-driven-side surface, and in which the chain pitch CP is longer than the tooth pitch A' so that a gap between the chain roller 38 and the tooth 130 is formed sufficiently at the vicinity of a rear derailleur. However, in this conventional sprocket 114, the presence of such a gap in the second to last tooth 130 before disengagement results in giving a rider uncomfortable shock because the chain roller CR2 hits against the driven-side surface of the second to last tooth 130 when the chain roller CR1 disengages from the sprocket 114. Therefore, as the gap becomes smaller in the chain disengagement portion, the more preferable drive force is transferred to reduce such uncomfortable shock for a rider. Further, a smaller gap in the chain disengagement portion leads to improve drive efficiency. The configuration of the troughs 32 according to the present invention is advantageous in terms of reducing such uncomfortable shock for a rider and in terms of such improved drive efficiency.

Second Embodiment

Figure 12:
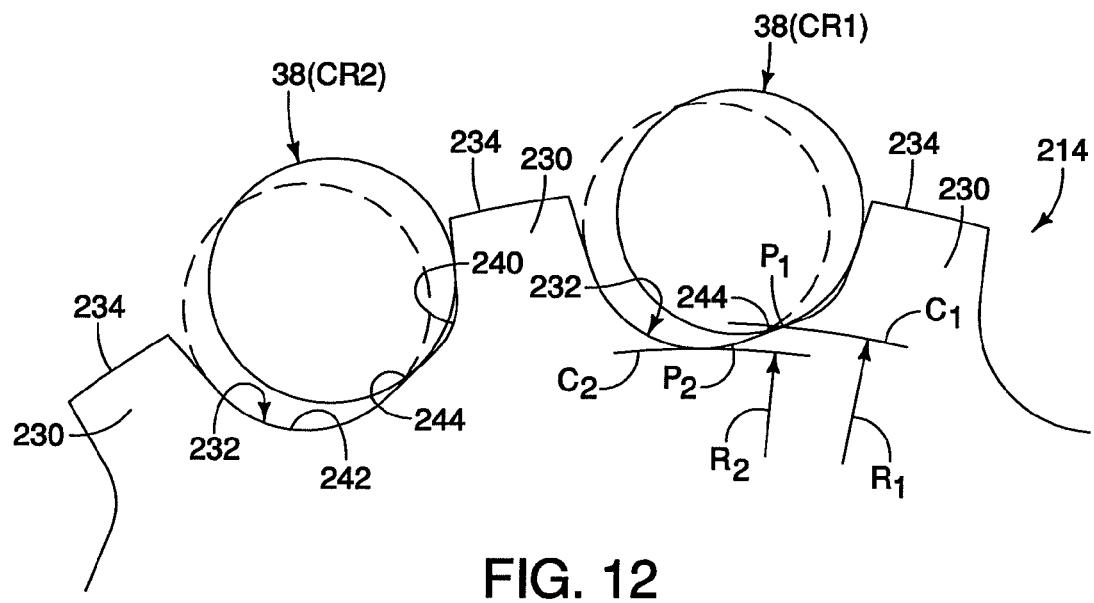
FIG. 12 is an enlarged, partial side elevational view of two teeth of a sprocket in accordance with a second embodiment.

Referring now to FIG. 12, a sprocket 214 in accordance with a second embodiment will now be explained. The sprocket 214 has a plurality of teeth 230 (only three shown) defining troughs 232 (only two shown). Basically, the outer peripheral edges of the troughs 232 between the teeth 230 are all identical in this embodiment. However, alternatively, not all of the troughs 232 are identical. Rather, preferably at least more than half of the consecutive pairs of the troughs 232 have the configuration shown in FIG. 12. More preferably, more than 80% of the consecutive pairs of the troughs 232 have the configuration shown in FIG. 12. Moreover, alternatively, the outer peripheral edges of some of consecutive pairs of the troughs (not shown) of the sprocket 214 can be configured according to one or more of the other embodiments as needed and/or desired. In other words, the troughs 232 can be used in conjunction with consecutive pairs of the troughs of the other embodiments as needed and/or desired. For sake of brevity, only two consecutive pairs of the troughs 232 of the teeth 230 will be illustrated herein.

As seen from FIG. 12, each of the troughs 232 of the teeth 230 includes a driven-side surface 240 and a non-driven-side surface 242. The boundary between the driven-side surface 240 and the non-driven-side surface 242 for each of the troughs 232 is connected by a transition surface 244 that extends between the driven-side and non-driven-side surfaces 240 and 242, respectively. The driven-side surface 240 is located downstream of the non-driven-side surface 242 relative to the rotational direction R. The driven-side surfaces 240 of the troughs 232 contact the chain rollers 38 to drive the chain 18 in the drive direction D (FIG. 4).

Each of the driven-side surfaces 240 has a first chain roller contact point $P_1$ disposed at a first position corresponding to a first radius $R_1$ of a first minimum contact circle $C_1$ with a center point on the center rotational axis of the bicycle sprocket 214 when one of the chain rollers 38 is positioned to fittingly contact the driven-side surface 240. Each of the non-driven-side surfaces 242 has a second chain roller contact point $P_2$ disposed at a second position corresponding to a second radius $R_2$ of a second minimum contact circle $C_2$ with a center point on the center rotational axis of the bicycle sprocket 214 when one of the chain rollers 38 is positioned to fittingly contact the non-driven-side surface 242. The first radius $R_1$ is larger than the second radius $R_2$. The transition surface 244 is defined as the portion of the trough 232 that is between the first and second chain roller contact points $P_1$ and $P_2$. Thus, the driven-side surface 240 extends from the tip end 234 of the downstream tooth 230 to the first chain roller contact point $P_1$, while the non-driven-side surface 242 extends from the tip end 234 of the upstream tooth 230 to the second chain roller contact point $P_2$, for a given one of the troughs 232. As in the first embodiment, the first radius $R_1$ of the driven-side surface 240 is larger than the second radius $R_2$ of the non-driven-side surface 242.

In this illustrated embodiment, each of the driven-side surfaces 240 has an effective concavity that is less than the curvatures of the chain rollers 38 as shown. In other words, the effective concavity of each of the driven-side surfaces 240 is formed by a curved surface with a single curvature, respectively, that is less than the curvatures of the chain rollers 38. The non-driven-side surfaces 242 are curved surfaces with effective concavities that are equal to the curvatures of the chain rollers 38. In other words, the effective concavity of each of the non-driven-side surfaces 242 is formed by a curved surface with a single curvature, respectively. The transition surfaces 244 are linear or flat surfaces that extend between the driven-side and non-driven-side surfaces 240 and 242, respectively.

Third Embodiment

Figure 13:
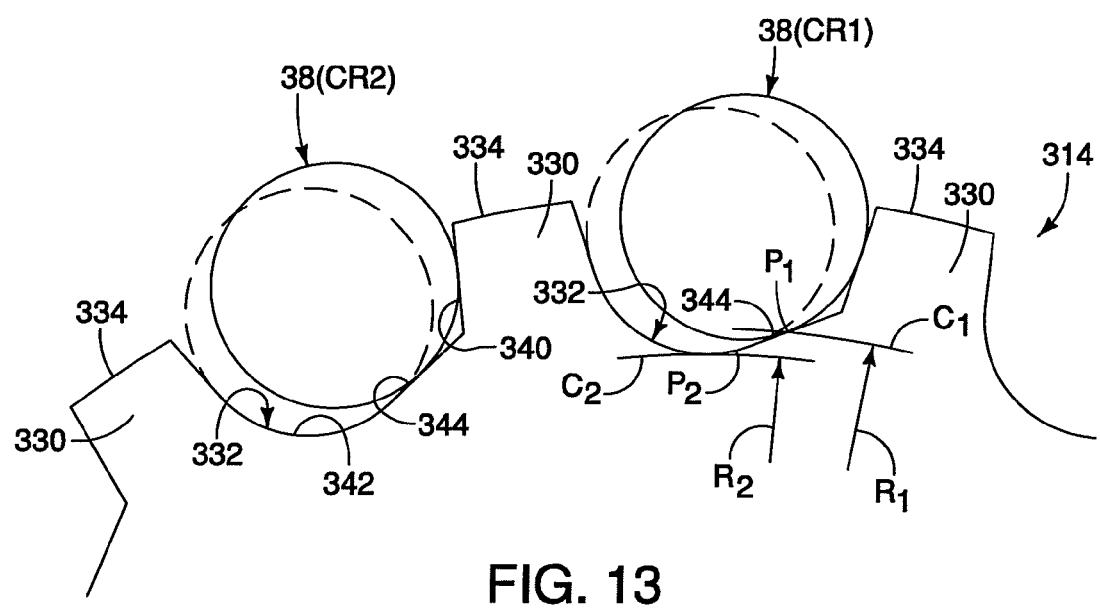
FIG. 13 is an enlarged, partial side elevational view of two teeth of a sprocket in accordance with a third embodiment.

Referring now to FIG. 13, a sprocket 314 in accordance with a third embodiment will now be explained. The sprocket 314 has a plurality of teeth 330 (only three shown) defining troughs 332 (only two shown). Basically, the outer peripheral edges of the troughs 332 between the teeth 330 are all identical in this embodiment. However, alternatively, not all of the troughs 332 are identical. Rather, preferably at least more than half of the consecutive pairs of the troughs 332 have the configuration shown in FIG. 13. More preferably, more than 80% of the consecutive pairs of the troughs 332 have the configuration shown in FIG. 13 Moreover, alternatively, the outer peripheral edges of some of consecutive pairs of the troughs (not shown) of the sprocket 314 can be configured according to one or more of the other embodiments as needed and/or desired. In other words, the troughs 332 can be used in conjunction with consecutive pairs of the troughs of the other embodiments as needed and/or desired. For sake of brevity, only two consecutive pairs of the troughs 332 of the teeth 330 will be illustrated herein.

As seen from FIG. 13, each of the troughs 332 of the teeth 330 includes a driven-side surface 340 and a non-driven-side surface 342. The boundary between the driven-side surface 340 and the non-driven-side surface 342 for each of the troughs 332 is connected by a transition surface 344 that extends between the driven-side and non-driven-side surfaces 340 and 342, respectively. The driven-side surface 340 is located downstream of the non-driven-side surface 342 relative to the rotational direction R. The driven-side surfaces 340 of the troughs 332 contact the chain rollers 38 to drive the chain 18 in the drive direction D (FIG. 4).

Each of the driven-side surfaces 340 has a first chain roller contact point $P_1$ disposed at a first position corresponding to a first radius $R_1$ of a first minimum contact circle $C_1$ with a center point on the center rotational axis of the bicycle sprocket 314 when one of the chain rollers 38 is positioned to fittingly contact the driven-side surface 340. Each of the non-driven-side surfaces 342 has a second chain roller contact point $P_2$ disposed at a second position corresponding to a second radius $R_2$ of a second minimum contact circle $C_2$ with a center point on the center rotational axis of the bicycle sprocket 314 when one of the chain rollers 38 is positioned to fittingly contact the non-driven-side surface 342. The first radius $R_1$ is larger than the second radius $R_2$. The transition surface 344 is defined as the portion of the trough 332 that is between the first and second chain roller contact points $P_1$ and $P_2$. Thus, the driven-side surface 340 extends from the tip end 334 of the downstream tooth 330 to the first chain roller contact point $P_1$, while the non-driven-side surface 342 extends from the tip end 334 of the upstream tooth 330 to the second chain roller contact point $P_2$, for a given one of the troughs 332. As in the first embodiment, the first radius $R_1$ of the driven-side surface 340 is larger than the second radius $R_2$ of the non-driven-side surface 342.

In this illustrated embodiment, each of the driven-side surfaces 340 has an effective concavity that is less than the curvatures of the chain rollers 38 as shown. In particular, the effective concavity of each of the driven-side surfaces 340 is foamed by two flat or linear surfaces, respectively, with a sharp transition point therebetween. Thus, the driven-side surfaces 340 are non-curved surfaces. The non-driven-side surfaces 342 are curved surfaces with effective concavities that are equal to the curvatures of the chain rollers 38. In other words, the effective concavity of each of the non-driven-side surfaces 342 is formed by a curved surface with a single curvature, respectively. The transition surfaces 344 are linear or flat surfaces that extend between the driven-side and non-driven-side surfaces 340 and 342, respectively.

Fourth Embodiment

Figure 14:
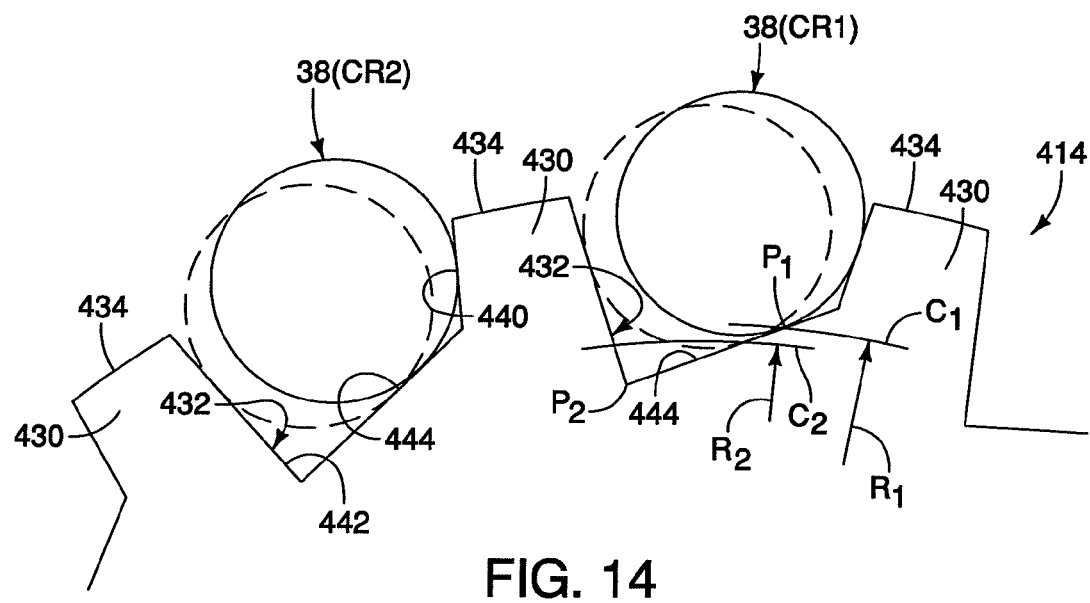
FIG. 14 is an enlarged, partial side elevational view of two teeth of a sprocket in accordance with a fourth embodiment.

Referring now to FIG. 14, a sprocket 414 in accordance with a fourth embodiment will now be explained. The sprocket 414 has a plurality of teeth 430 (only three shown) defining troughs 432 (only two shown). Basically, the outer peripheral edges of the troughs 432 between the teeth 430 are all identical in this embodiment. For sake of brevity, only two of the troughs 432 of the teeth 430 will be illustrated herein. However, alternatively, not all of the troughs 432 are identical. Rather, preferably at least more than half of the consecutive pairs of the troughs 432 have the configuration shown in FIG. 14. More preferably, more than 80% of the consecutive pairs of the troughs 432 have the configuration shown in FIG. 14. Moreover, alternatively, the outer peripheral edges of some of consecutive pairs of the troughs (not shown) of the sprocket 414 can be configured according to one or more of the other embodiments as needed and/or desired. In other words, the troughs 432 can be used in conjunction with consecutive pairs of the troughs of the other embodiments as needed and/or desired. For sake of brevity, only two consecutive pairs of the troughs 432 of the teeth 430 will be illustrated herein.

As seen from FIG. 14, each of the troughs 432 of the teeth 430 includes a driven-side surface 440 and a non-driven-side surface 442. The boundary between the driven-side surface 440 and the non-driven-side surface 442 for each of the troughs 432 is connected by a transition surface 444 that extends between the driven-side and non-driven-side surfaces 440 and 442, respectively. The driven-side surface 440 is located downstream of the non-driven-side surface 442 relative to the rotational direction R. The driven-side surfaces 440 of the troughs 432 contact the chain rollers 38 to drive the chain 18 in the drive direction D (FIG. 4).

Each of the driven-side surfaces 440 has a first chain roller contact point $P_1$ disposed at a first position corresponding to a first radius $R_1$ of a first minimum contact circle $C_1$ with a center point on the center rotational axis of the bicycle sprocket 414 when one of the chain rollers 38 is positioned to fittingly contact the driven-side surface 440. Each of the non-driven-side surfaces 442 has a second chain roller contact point $P_2$ disposed at a second position corresponding to a second radius $R_2$ of a second minimum contact circle $C_2$ with a center point on the center rotational axis of the bicycle sprocket 414 when one of the chain rollers 38 is positioned to fittingly contact the non-driven-side surface 442. The first radius $R_1$ is larger than the second radius $R_2$. The transition surface 444 is defined as the portion of the trough 432 that is between the first and second chain roller contact points $P_1$ and $P_2$. Thus, the driven-side surface 440 extends from the tip end 434 of the downstream tooth 430 to the first chain roller contact point $P_1$, while the non-driven-side surface 442 extends from the tip end 434 of the upstream tooth 430 to the second chain roller contact point $P_2$, for a given one of the troughs 432. As in the first embodiment, the first radius $R_1$ of the driven-side surface 440 is larger than the second radius $R_2$ of the non-driven-side surface 442.

In this illustrated embodiment, each of the driven-side surfaces 440 has an effective concavity that is less than the curvatures of the chain rollers 38 as shown. In particular, the effective concavity of each of the driven-side surfaces 440 is formed by two flat or linear surfaces, respectively. Thus, the driven-side surfaces 440 are each formed by two flat or linear surfaces, respectively, with a sharp transition point therebetween. The non-driven-side surfaces 442 are non-curved surfaces that have effective concavities that are smaller than the curvatures of the chain rollers 38 in that the non-driven-side surfaces 442 are foamed by two flat or linear surfaces, respectively. The transition surfaces 444 are linear or flat surfaces that extend between the driven-side and non-driven-side surfaces 440 and 442, respectively. In this embodiment, the transition surface 444 in each trough 432 lies in the same plane as the linear surfaces of the driven-side surfaces 440 and the driven-side surfaces 442 that are contiguous with the transition surface 444.

Fifth Embodiment

Figure 15:
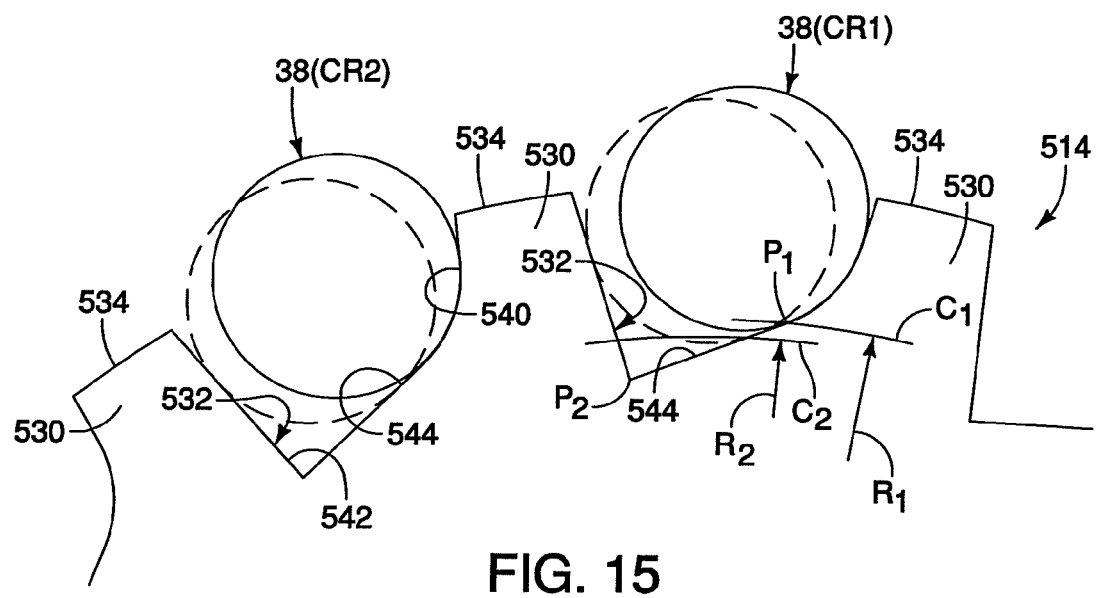
FIG. 15 is an enlarged, partial side elevational view of two teeth of a sprocket in accordance with a fifth embodiment.

Referring now to FIG. 15, a sprocket 514 in accordance with a fifth embodiment will now be explained. The sprocket 514 has a plurality of teeth 530 (only three shown) defining troughs 532 (only two shown). Basically, the outer peripheral edges of the troughs 532 between the teeth 530 are all identical in this embodiment. For sake of brevity, only two of the troughs 532 of the teeth 530 will be illustrated herein. However, alternatively, not all of the troughs 532 are identical. Rather, preferably at least more than half of the consecutive pairs of the troughs 532 have the configuration shown in FIG. 15. More preferably, more than 80% of the consecutive pairs of the troughs 532 have the configuration shown in FIG. 15. Moreover, alternatively, the outer peripheral edges of some of consecutive pairs of the troughs (not shown) of the sprocket 514 can be configured according to one or more of the other embodiments as needed and/or desired. In other words, the troughs 532 can be used in conjunction with consecutive pairs of the troughs of the other embodiments as needed and/or desired. For sake of brevity, only two consecutive pairs of the troughs 532 of the teeth 530 will be illustrated herein.

As seen from FIG. 15, each of the troughs 532 of the teeth 530 includes a driven-side surface 540 and a non-driven-side surface 542. The boundary between the driven-side surface 540 and the non-driven-side surface 542 for each of the troughs 532 is connected by a transition surface 544 that extends between the driven-side and non-driven-side surfaces 540 and 542, respectively. The driven-side surface 540 is located downstream of the non-driven-side surface 542 relative to the rotational direction R. The driven-side surfaces 540 of the troughs 532 contact the chain rollers 38 to drive the chain 18 in the drive direction D (FIG. 4).

Each of the driven-side surfaces 540 has a first chain roller contact point $P_1$ disposed at a first position corresponding to a first radius $R_1$ of a first minimum contact circle $C_1$ with a center point on the center rotational axis of the bicycle sprocket 514 when one of the chain rollers 38 is positioned to fittingly contact the driven-side surface 540. Each of the non-driven-side surfaces 542 has a second chain roller contact point $P_2$ disposed at a second position corresponding to a second radius $R_2$ of a second minimum contact circle $C_2$ with a center point on the center rotational axis of the bicycle sprocket 514 when one of the chain rollers 38 is positioned to fittingly contact the non-driven-side surface 542. The first radius $R_1$ is larger than the second radius $R_2$. The transition surface 544 is defined as the portion of the trough 532 that is between the first and second chain roller contact points $P_1$ and $P_2$. Thus, the driven-side surface 540 extends from the tip end 534 of the downstream tooth 530 to the first chain roller contact point $P_1$, while the non-driven-side surface 542 extends from the tip end 534 of the upstream tooth 530 to the second chain roller contact point $P_2$, for a given one of the troughs 532. As in the first embodiment, the first radius $R_1$ of the driven-side surface 540 is larger than the second radius $R_2$ of the non-driven-side surface 542.

In this illustrated embodiment, each of the driven-side surfaces 540 has an effective concavity that is equal to the curvatures of the chain rollers 38 as shown. In other words, the effective concavity of each of the driven-side surfaces 540 is foamed by a curved surface with a single curvature, respectively. The non-driven-side surfaces 542 are non-curved surfaces that have effective concavities that are smaller than the curvatures of the chain rollers 38 in that the non-driven-side surfaces 542 are formed by two flat or linear surfaces, respectively. The transition surfaces 544 are linear or flat surfaces that extend between the driven-side and non-driven-side surfaces 540 and 542, respectively. In this embodiment, the transition surface 544 in each trough 532 lies in the same plane as the linear surfaces of the driven-side surfaces 540 that are contiguous with the transition surface 544.

Sixth Embodiment

Figure 16:
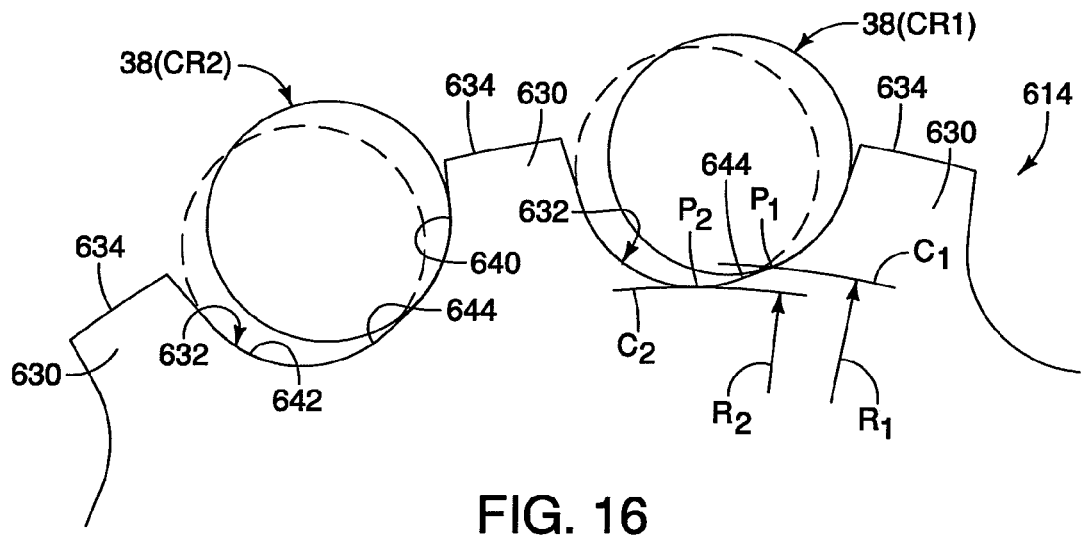
FIG. 16 is an enlarged, partial side elevational view of two teeth of a sprocket in accordance with a sixth embodiment.

Referring now to FIG. 16, a sprocket 614 in accordance with a sixth embodiment will now be explained. The sprocket 614 has a plurality of teeth 630 (only three shown) defining troughs 632 (only two shown). Basically, the outer peripheral edges of the troughs 632 between the teeth 630 are all identical in this embodiment. However, alternatively, not all of the troughs 632 are identical. Rather, preferably at least more than half of the consecutive pairs of the troughs 632 have the configuration shown in FIG. 16. More preferably, more than 80% of the consecutive pairs of the troughs 632 have the configuration shown in FIG. 16. Moreover, alternatively, the outer peripheral edges of some of consecutive pairs of the troughs (not shown) of the sprocket 614 can be configured according to one or more of the other embodiments as needed and/or desired. In other words, the troughs 632 can be used in conjunction with consecutive pairs of the troughs of the other embodiments as needed and/or desired. For sake of brevity, only two consecutive pairs of the troughs 632 of the teeth 630 will be illustrated herein.

As seen from FIG. 16, each of the troughs 632 of the teeth 630 includes a driven-side surface 640 and a non-driven-side surface 642. The boundary between the driven-side surface 640 and the non-driven-side surface 642 for each of the troughs 632 is connected by a transition surface 644 that extends between the driven-side and non-driven-side surfaces 640 and 642, respectively. The driven-side surface 640 is located downstream of the non-driven-side surface 642 relative to the rotational direction R. The driven-side surfaces 640 of the troughs 632 contact the chain rollers 38 to drive the chain 18 in the drive direction D (FIG. 4).

Each of the driven-side surfaces 640 has a first chain roller contact point $P_1$ disposed at a first position corresponding to a first radius $R_1$ of a first minimum contact circle $C_1$ with a center point on the center rotational axis of the bicycle sprocket 614 when one of the chain rollers 38 is positioned to fittingly contact the driven-side surface 640. Each of the non-driven-side surfaces 642 has a second chain roller contact point $P_2$ disposed at a second position corresponding to a second radius $R_2$ of a second minimum contact circle $C_2$ with a center point on the center rotational axis of the bicycle sprocket 614 when one of the chain rollers 38 is positioned to fittingly contact the non-driven-side surface 642. The first radius $R_1$ is larger than the second radius $R_2$. The transition surface 644 is defined as the portion of the trough 632 that is between the first and second chain roller contact points $P_1$ and $P_2$. Thus, the driven-side surface 640 extends from the tip end 634 of the downstream tooth 630 to the first chain roller contact point $P_1$, while the non-driven-side surface 642 extends from the tip end 634 of the upstream tooth 630 to the second chain roller contact point $P_2$, for a given one of the troughs 632. As in the first embodiment, the first radius $R_1$ of the driven-side surface 640 is larger than the second radius $R_2$ of the non-driven-side surface 642.

In this illustrated embodiment, each of the driven-side surfaces 640 has an effective concavity that is equal to the curvatures of the chain rollers 38 as shown. In other words, the effective concavity of each of the driven-side surfaces 640 is formed by a curved surface with a single curvature, respectively. The non-driven-side surfaces 642 are curved surfaces with effective concavities that are larger than the curvatures of the chain rollers 38. In other words, the effective concavity of each of the non-driven-side surfaces 642 is formed by a curved surface with a single curvature, respectively. The transition surfaces 644 are linear or flat surfaces that extend between the driven-side and non-driven-side surfaces 640 and 642, respectively.

Seventh Embodiment

Figure 17:
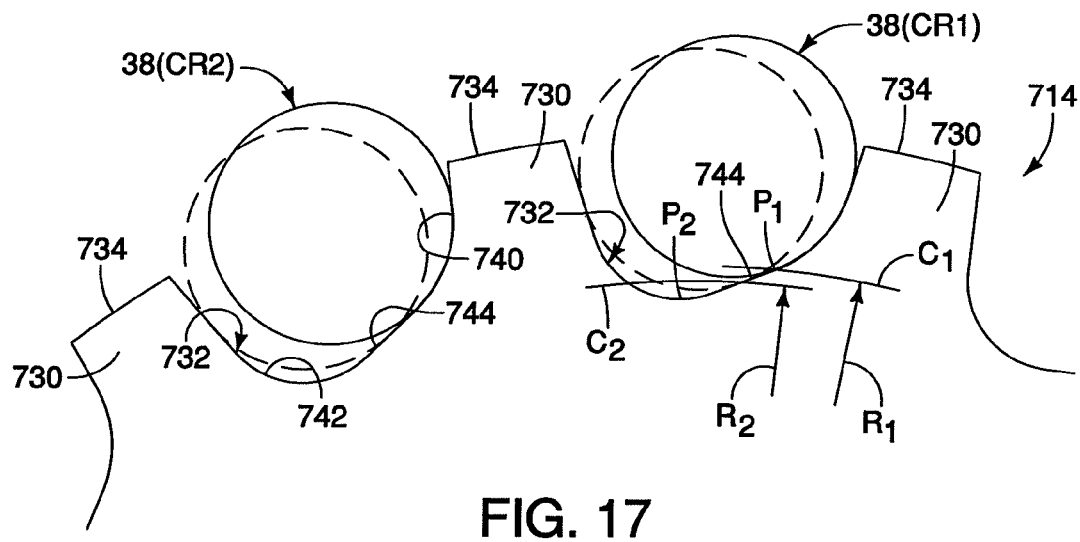
FIG. 17 is an enlarged, partial side elevational view of two teeth of a sprocket in accordance with a seventh embodiment.

Referring now to FIG. 17, a sprocket 714 in accordance with a seventh embodiment will now be explained. The sprocket 714 has a plurality of teeth 730 (only three shown) defining troughs 732 (only two shown). Basically, the outer peripheral edges of the troughs 732 between the teeth 730 are all identical in this embodiment. However, alternatively, not all of the troughs 732 are identical. Rather, preferably at least more than half of the consecutive pairs of the troughs 732 have the configuration shown in FIG. 17. More preferably, more than 80% of the consecutive pairs of the troughs 732 have the configuration shown in FIG. 17. Moreover, alternatively, the outer peripheral edges of some of consecutive pairs of the troughs (not shown) of the sprocket 714 can be configured according to one or more of the other embodiments as needed and/or desired. In other words, the troughs 732 can be used in conjunction with consecutive pairs of the troughs of the other embodiments as needed and/or desired. For sake of brevity, only two consecutive pairs of the troughs 732 of the teeth 730 will be illustrated herein.

As seen from FIG. 17, each of the troughs 732 of the teeth 730 includes a driven-side surface 740 and a non-driven-side surface 742. The boundary between the driven-side surface 740 and the non-driven-side surface 742 for each of the troughs 732 is connected by a transition surface 744 that extends between the driven-side and non-driven-side surfaces 740 and 742, respectively. The driven-side surface 740 is located downstream of the non-driven-side surface 742 relative to the rotational direction R. The driven-side surfaces 740 of the troughs 732 contact the chain rollers 38 to drive the chain 18 in the drive direction D (FIG. 4).

Each of the driven-side surfaces 740 has a first chain roller contact point $P_1$ disposed at a first position corresponding to a first radius $R_1$ of a first minimum contact circle $C_1$ with a center point on the center rotational axis of the bicycle sprocket 714 when one of the chain rollers 38 is positioned to fittingly contact the driven-side surface 740. Each of the non-driven-side surfaces 742 has a second chain roller contact point $P_2$ disposed at a second position corresponding to a second radius $R_2$ of a second minimum contact circle $C_2$ with a center point on the center rotational axis of the bicycle sprocket 714 when one of the chain rollers 38 is positioned to fittingly contact the non-driven-side surface 742. The first radius $R_1$ is larger than the second radius $R_2$. The transition surface 744 is defined as the portion of the trough 732 that is between the first and second chain roller contact points $P_1$ and $P_2$. Thus, the driven-side surface 740 extends from the tip end 734 of the downstream tooth 730 to the first chain roller contact point $P_1$, while the non-driven-side surface 742 extends from the tip end 734 of the upstream tooth 730 to the second chain roller contact point $P_2$, for a given one of the troughs 732. As in the first embodiment, the first radius $R_1$ of the driven-side surface 740 is larger than the second radius $R_2$ of the non-driven-side surface 742.

In this illustrated embodiment, each of the driven-side surfaces 740 has an effective concavity that is equal to the curvatures of the chain rollers 38 as shown. In other words, the effective concavity of each of the driven-side surfaces 740 is formed by a curved surface with a single curvature, respectively. The non-driven-side surfaces 742 are curved surfaces with effective concavities that are less than the curvatures of the chain rollers 38. In other words, the effective concavity of each of the non-driven-side surfaces 742 is formed by a curved surface with a single curvature, respectively. The transition surfaces 744 are concavely curved surfaces that extend between the driven-side and non-driven-side surfaces 740 and 742, respectively.

Eighth Embodiment

Figure 18:
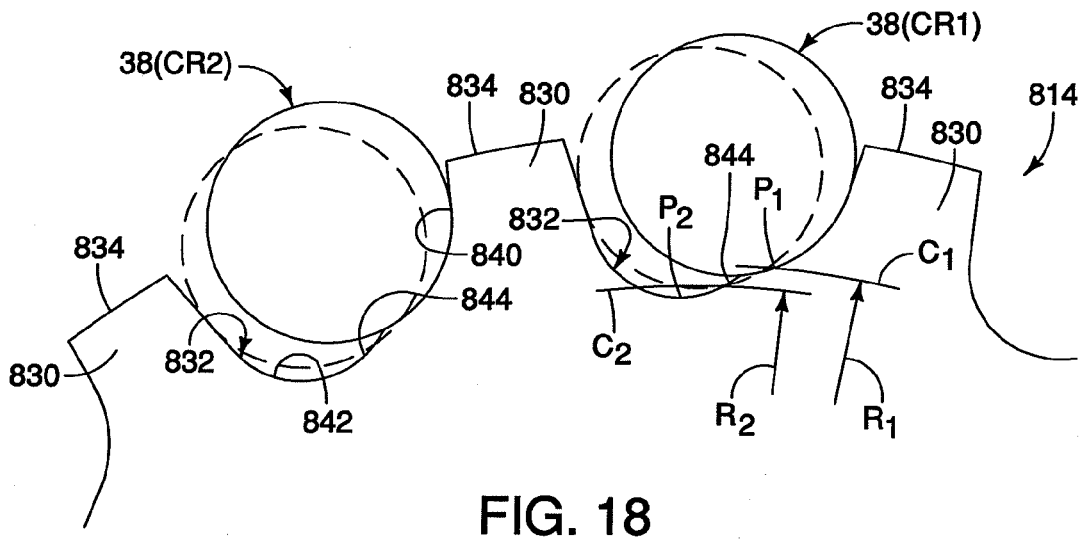
FIG. 18 is an enlarged, partial side elevational view of two teeth of a sprocket in accordance with an eighth embodiment.

Referring now to FIG. 18, a sprocket 814 in accordance with an eighth embodiment will now be explained. The sprocket 814 has a plurality of teeth 830 (only three shown) defining troughs 832 (only two shown). Basically, the outer peripheral edges of the troughs 832 between the teeth 830 are all identical in this embodiment. However, alternatively, not all of the troughs 832 are identical. Rather, preferably at least more than half of the consecutive pairs of the troughs 832 have the configuration shown in FIG. 18. More preferably, more than 80% of the consecutive pairs of the troughs 832 have the configuration shown in FIG. 18. Moreover, alternatively, the outer peripheral edges of some of consecutive pairs of the troughs (not shown) of the sprocket 814 can be configured according to one or more of the other embodiments as needed and/or desired. In other words, the troughs 832 can be used in conjunction with consecutive pairs of the troughs of the other embodiments as needed and/or desired. For sake of brevity, only two consecutive pairs of the troughs 832 of the teeth 830 will be illustrated herein.

As seen from FIG. 18, each of the troughs 832 of the teeth 830 includes a driven-side surface 840 and a non-driven-side surface 842. The boundary between the driven-side surface 840 and the non-driven-side surface 842 for each of the troughs 832 is connected by a transition surface 844 that extends between the driven-side and non-driven-side surfaces 840 and 842, respectively. The driven-side surface 840 is located downstream of the non-driven-side surface 842 relative to the rotational direction R. The driven-side surfaces 840 of the troughs 832 contact the chain rollers 38 to drive the chain 18 in the drive direction D (FIG. 4).

Each of the driven-side surfaces 840 has a first chain roller contact point $P_1$ disposed at a first position corresponding to a first radius $R_1$ of a first minimum contact circle $C_1$ with a center point on the center rotational axis of the bicycle sprocket 814 when one of the chain rollers 38 is positioned to fittingly contact the driven-side surface 840. Each of the non-driven-side surfaces 842 has a second chain roller contact point $P_2$ disposed at a second position corresponding to a second radius $R_2$ of a second minimum contact circle $C_2$ with a center point on the center rotational axis of the bicycle sprocket 814 when one of the chain rollers 38 is positioned to fittingly contact the non-driven-side surface 842. The first radius $R_1$ is larger than the second radius $R_2$. The transition surface 844 is defined as the portion of the trough 832 that is between the first and second chain roller contact points $P_1$ and $P_2$. Thus, the driven-side surface 840 extends from the tip end 834 of the downstream tooth 830 to the first chain roller contact point $P_1$, while the non-driven-side surface 842 extends from the tip end 834 of the upstream tooth 830 to the second chain roller contact point $P_2$, for a given one of the troughs 832. As in the first embodiment, the first radius $R_1$ of the driven-side surface 840 is larger than the second radius $R_2$ of the non-driven-side surface 842.

In this illustrated embodiment, each of the driven-side surfaces 840 has an effective concavity that is equal to the curvatures of the chain rollers 38 as shown. In other words, the effective concavity of each of the driven-side surfaces 840 is formed by a curved surface with a single curvature, respectively. The non-driven-side surfaces 842 are curved surfaces with effective concavities that are less than the curvatures of the chain rollers 38. In other words, the effective concavity of each of the non-driven-side surfaces 842 is formed by a curved surface with a single curvature, respectively. The transition surfaces 844 are convexly curved surfaces that extend between the driven-side and non-driven-side surfaces 840 and 842, respectively.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle sprocket comprising:
   a sprocket body having a center rotational axis of the bicycle sprocket; and
   a chain engagement structure disposed on an outer periphery of the sprocket body, the chain engagement structure including a plurality of sprocket teeth extending radially outward from the outer periphery of the sprocket body with the sprocket teeth being circumferentially spaced around the outer periphery of the sprocket body such that the sprocket teeth define a plurality of troughs for receiving chain rollers of a bicycle chain,
   two consecutive ones of the troughs each including a driven-side surface and a non-driven-side surface, with each of the driven-side surfaces having a first chain roller contact point disposed at a first position corresponding to a first radius of a first minimum contact circle with a center point on the center rotational axis of the bicycle sprocket when one of the chain rollers is positioned to fittingly contact the driven-side surface, each of the non-driven-side surfaces having a second chain roller contact point disposed at a second position corresponding to a second radius of a second minimum contact circle with a center point on the center rotational axis of the bicycle sprocket when one of the chain rollers is positioned to fittingly contact the non-driven-side surface, the first radius being larger than the second radius, each of the driven-side surfaces having an effective concavity that is equal to or less than a curvatures of the chain rollers.
2. The bicycle sprocket according to claim 1, wherein the effective concavities of the driven-side surfaces are curved surfaces with curvatures that are equal to the curvatures of the chain rollers.
3. The bicycle sprocket according to claim 2, wherein the driven-side surfaces are curved surfaces.
4. The bicycle sprocket according to claim 1, wherein each of the non driven-side surfaces are curved surfaces that have curvatures that are equal to the curvatures of the chain rollers.
5. The bicycle sprocket according to claim 1, wherein the two consecutive ones of the troughs each further includes a transition surface extending between the driven-side and non-driven-side surfaces, respectively.
6. The bicycle sprocket according to claim 5, wherein the transition surfaces are linear between the driven-side and non-driven-side surfaces, respectively.
7. The bicycle sprocket according to claim 1, wherein the effective concavities of the driven-side surfaces are less than the curvatures of the chain rollers.
8. The bicycle sprocket according to claim 7, wherein the driven-side surfaces are curved surfaces.
9. The bicycle sprocket according to claim 7, wherein the effective concavities of the driven-side surfaces are formed by at least two surfaces with a transition point therebetween.
10. The bicycle sprocket according to claim 9, wherein each of the two surfaces forming the effective concavities of the driven-side surfaces are linear surfaces.
11. The bicycle sprocket according to claim 1, wherein each of the non driven-side surfaces are formed of non-curved surfaces that are arranged to form effective concavities that less than the curvatures of the chain rollers.
12. The bicycle sprocket according to claim 1, wherein each of the non driven-side surfaces are curved surfaces having a curvature that is larger than the curvatures of the chain rollers.
13. The bicycle sprocket according to claim 5, wherein the transition surfaces are concavely curved, respectively.
14. The bicycle sprocket according to claim 5, wherein the transition surfaces are convexly curved surfaces, respectively.

* * * * *